US007373372B1

(12) United States Patent
Prpic et al.

(10) Patent No.: US 7,373,372 B1
(45) Date of Patent: May 13, 2008

(54) METHOD FOR ACCREDITING EVENT PARTICIPANTS

(75) Inventors: Eva Prpic, Chatswood (AU); Katherine J. Baker, Riverview (AU)

(73) Assignee: International Business Machines Corporation, Armonk, NY (US)

( * ) Notice: Subject to any disclaimer, the term of this patent is extended or adjusted under 35 U.S.C. 154(b) by 1182 days.

(21) Appl. No.: 09/657,956

(22) Filed: Sep. 8, 2000

(51) Int. Cl.
*G06K 5/00* (2006.01)
*H04L 9/00* (2006.01)

(52) U.S. Cl. ...................... 709/200; 235/380; 235/382; 713/184

(58) Field of Classification Search ............. 340/572.1; 705/14, 40, 1, 72, 2, 3, 17, 18; 380/24; 382/115; 709/217, 200; 455/411; 235/381, 380, 454, 235/382; 713/184
See application file for complete search history.

(56) References Cited

U.S. PATENT DOCUMENTS

| | | | | |
|---|---|---|---|---|
| 4,851,651 | A * | 7/1989 | Gaucher | 235/380 |
| 4,882,779 | A * | 11/1989 | Rahtgen | 705/72 |
| 5,241,600 | A * | 8/1993 | Hillis | 713/186 |
| 5,432,864 | A * | 7/1995 | Lu et al. | 382/118 |
| 5,548,106 | A * | 8/1996 | Liang et al. | 235/454 |
| 5,598,477 | A * | 1/1997 | Berson | 380/51 |
| 5,619,558 | A * | 4/1997 | Jheeta | 379/92.01 |
| 5,724,520 | A * | 3/1998 | Goheen | 705/5 |
| 5,737,701 | A * | 4/1998 | Rosenthal et al. | 455/411 |
| 5,841,886 | A * | 11/1998 | Rhoads | 382/115 |
| 5,949,046 | A * | 9/1999 | Kenneth et al. | 235/380 |
| 6,035,280 | A * | 3/2000 | Christensen | 705/14 |
| 6,092,841 | A * | 7/2000 | Best et al. | 283/56 |
| 6,129,275 | A * | 10/2000 | Urquhart et al. | 235/381 |
| 6,408,331 | B1 * | 6/2002 | Rhoads | 709/217 |
| 6,456,984 | B1 * | 9/2002 | Demoff et al. | 705/40 |
| 6,636,833 | B1 * | 10/2003 | Flitcroft et al. | 705/1 |
| 6,725,200 | B1 * | 4/2004 | Rost | 705/3 |
| 2002/0070863 | A1 * | 6/2002 | Brooking | 340/572.1 |
| 2002/0099665 | A1 * | 7/2002 | Burger et al. | 705/67 |

OTHER PUBLICATIONS

"De La Rue Gives Singapore the 'MIDIS' Touch Singapore Immigration & Registration Department Chooses De La Rue Identity Systems to Provide Automated Passport Production System" Dec. 2, 1998.*

(Continued)

*Primary Examiner*—Jeffrey Pwu
*Assistant Examiner*—Guang Li
(74) *Attorney, Agent, or Firm*—Anthony V. S. England; William Steinberg

(57) ABSTRACT

The present invention relates to the accreditation of participants to an event. Participants are invited to register, allowing an accreditation system (300) to collect information (325 and 320) from each of the participants. The accreditation system produces a non-valid pass for each of the participants, and the non-valid passes are issued to the participants. Upon arrival of a participant at, or proximate an event venue, the non-valid pass is validated. The validated pass typically serves as an identification and access control device to be worn by participants. Additionally, for foreign participants and before arrival of those participants, the accreditation system (300) sends a bulk visa request to an Immigration Authority (310), allowing the validated pass to serve as a visa.

10 Claims, 5 Drawing Sheets

OTHER PUBLICATIONS

"Cards & Personal Identification Technical Commitee" Jul. 2000.*
Immigration & Checkoints Authority "IC Registration" Dec. 16, 1996.*
Immigration & Checkoints Authority "Immigration Automated Clearance System" Dec. 1996.*
"Fairfield Ponte Vedra Decals and Access Cards", Jun. 17, 1998.*
"Armed Services Commissary Regulations" (ASCR), James L. Elmer Aug. 3, 1990.*
"European Commitee for Banking Standards", Jan. 1996.*
"Meal Card Program", Air Force Instruction 34-241, Nov. 1, 1997.*
"Validating and Using Your Pass", 1996, Britrail.*
"Railway International, European Rail Passes", 2000 Mediterranean.net.*
"Public Transportation", Journees Arithmetiques, Vatican City, Jul. 1999.*
"Travelocity" 1999.*
"Travel Agents", 1997.*
"Validating and Using your pass", 1996-1998.*
"XXI Journees Arithmetiques", Jul. 12-16, 1999.*

* cited by examiner

METHOD FOR ACCREDITING EVENT PARTICIPANTS

TECHNICAL FIELD OF THE INVENTION

The present invention relates generally to accreditation and, in particular, to accreditation of participants involved to an event.

BACKGROUND ART

The purpose of an accreditation process is to certify entities as meeting a predefined standard. In the case of participants involved in an event, they need to be certified as meeting a predefined standard usually set by an Organising Committee of the event. The "participants" not only include the performers during the event, but also the staff, contractors, officials and press. Hence, every person involved in staging the event may require a level of accreditation. In certain events, even the visitors are required to be accredited for entry to the event, even though the predefined qualification standard is set as very low.

The "event" may be a conference, with the participants including the speakers at the conference, the guests, exhibitors, organisers and contractors preparing the venue. The "event" may also be a political meeting or a sporting event.

The "event" may alternatively be a security area, such as a military or research centre. The participants may include staff and visitors to such centres.

Participants typically present their 'qualifications' to be involved in the event for accreditation. It is then determined whether those qualifications meet the predefined standards.

Each participant whose qualification meets those standards is usually presented with an accreditation pass as proof to others that they have been accredited. The accreditation pass may entitle those participants to certain access rights and privileges during the event.

DISCLOSURE OF THE INVENTION

It is an object of the present invention to provide an improved method of accrediting participants involved in an event.

According to a first aspect of the invention, there is provided a method of accrediting participants to an event, said method comprising the steps of:

collecting information from each of said participants;

producing a non-valid pass for each of said participants;

issuing respective non-valid passes to said participants; and upon arrival of each participant at, or proximate an event venue, validating said non-valid pass, thereby accrediting said participant.

According to a second aspect of the invention, there is provided an apparatus for accrediting participants to an event, said apparatus comprising:

means for collecting information from each of said participants;

means for producing a non-valid pass for each of said participants;

means for issuing respective non-valid passes to said participants; and upon a participant's arrival at, or proximate an event venue, means for validating said non-valid pass, thereby accrediting said participant.

BRIEF DESCRIPTION OF THE DRAWINGS

A preferred embodiment of the present invention will now be described with reference to the drawings, in which.

DETAILED DESCRIPTION INCLUDING BEST MODE

Figure 1A:
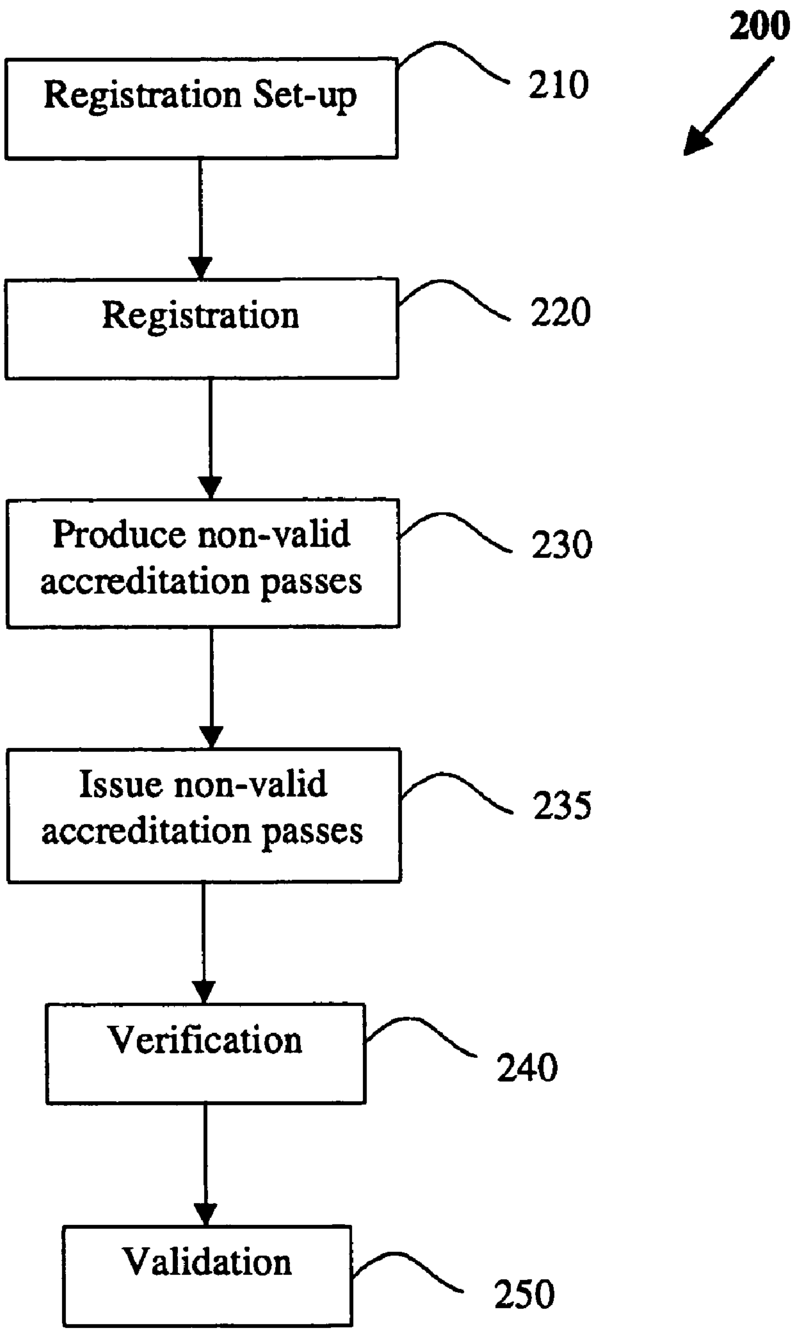
FIG. 1A is a flow diagram of an accreditation process.
Figure 1B:
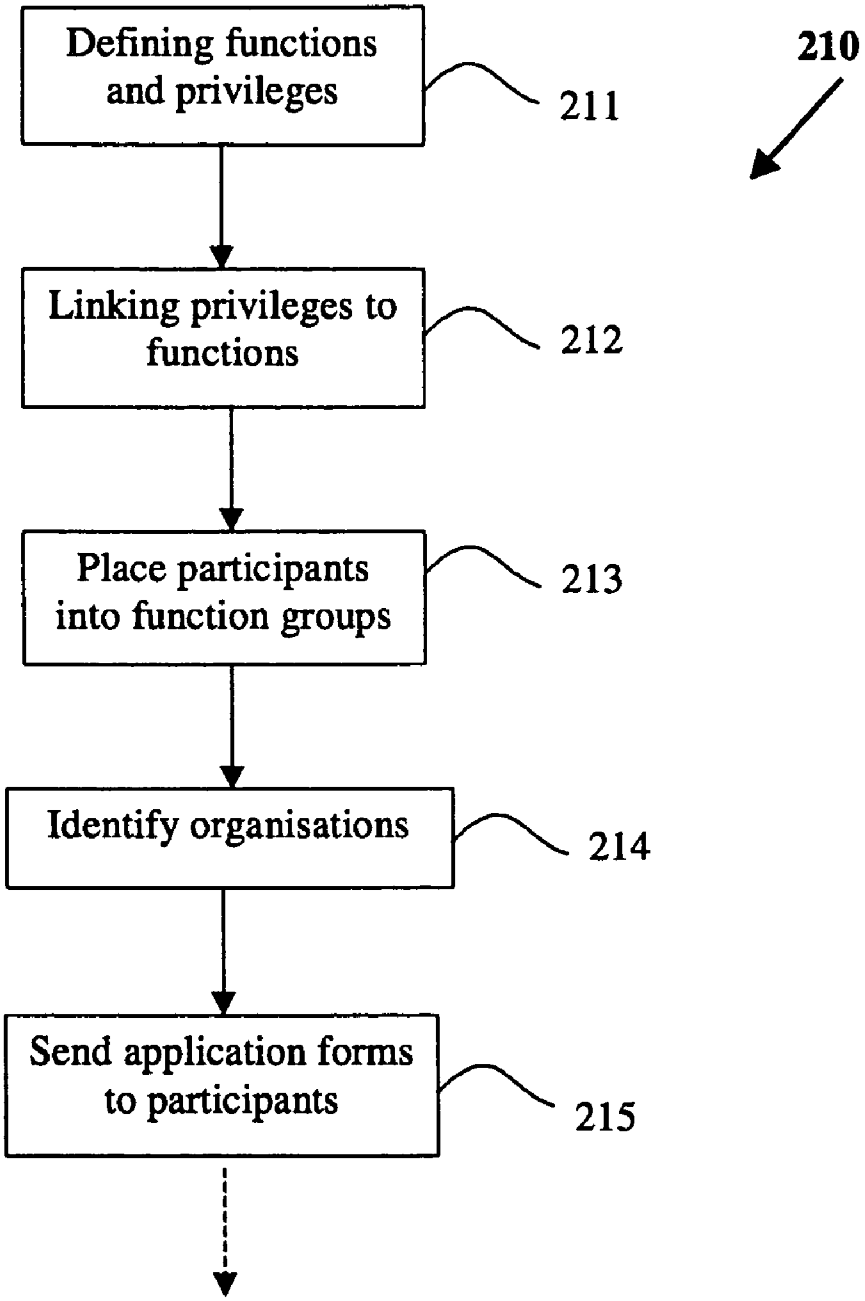
FIG. 1B is a flow diagram of sub-steps of the registration set-up step of the accreditation process shown in FIG. 1A.
Figure 1C:
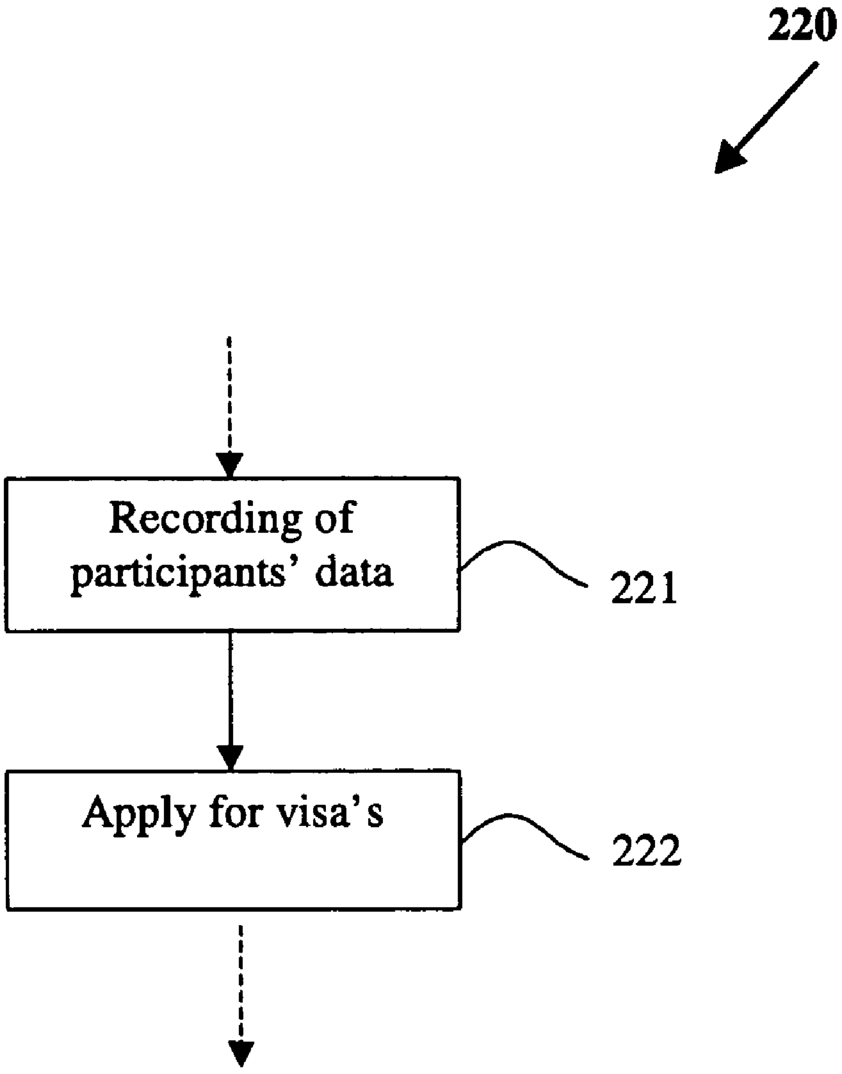
FIG. 1C is a flow diagram of sub-steps of the registration step of the accreditation process shown in FIG. 1A.

FIG. 1 shows an accreditation process 200 performed by an accreditation system 300 (FIG. 2) for accrediting of participants to obtain privileges during an event. For ease of explanation, the steps of the preferred embodiment are described with reference to an athletics event. However, it is not intended that the present invention be limited to the described method.

For an athletics event, the participants include the athletes and their trainers, officials, people involved in the Opening Ceremony, organisers, media representatives, guests, as well as staff, contractors and volunteers responsible for various supporting functions.

The accreditation process 200 starts in step 210, where a registration set-up is performed. The registration set-up step 210 consists of a number of sub-steps shown in FIG. 1B. Sub-step 211 defines functions and privileges, and sub-step 212 links the privileges to the functions. A privilege describes the rights to which every participant with that privilege is entitled. They include access rights to one or more access-controlled zones or venues, and rights to use transport and meal facilities. A function describes the role performed by the participants during the event.

In sub-step 213, participants are categorised in different collectives or function groups, thereby automatically inheriting privileges linked to that function. In the preferred embodiment, groups of participants are associated with one of a number of organisations. Such organisations are also identified in sub-step 214.

Figure 2:
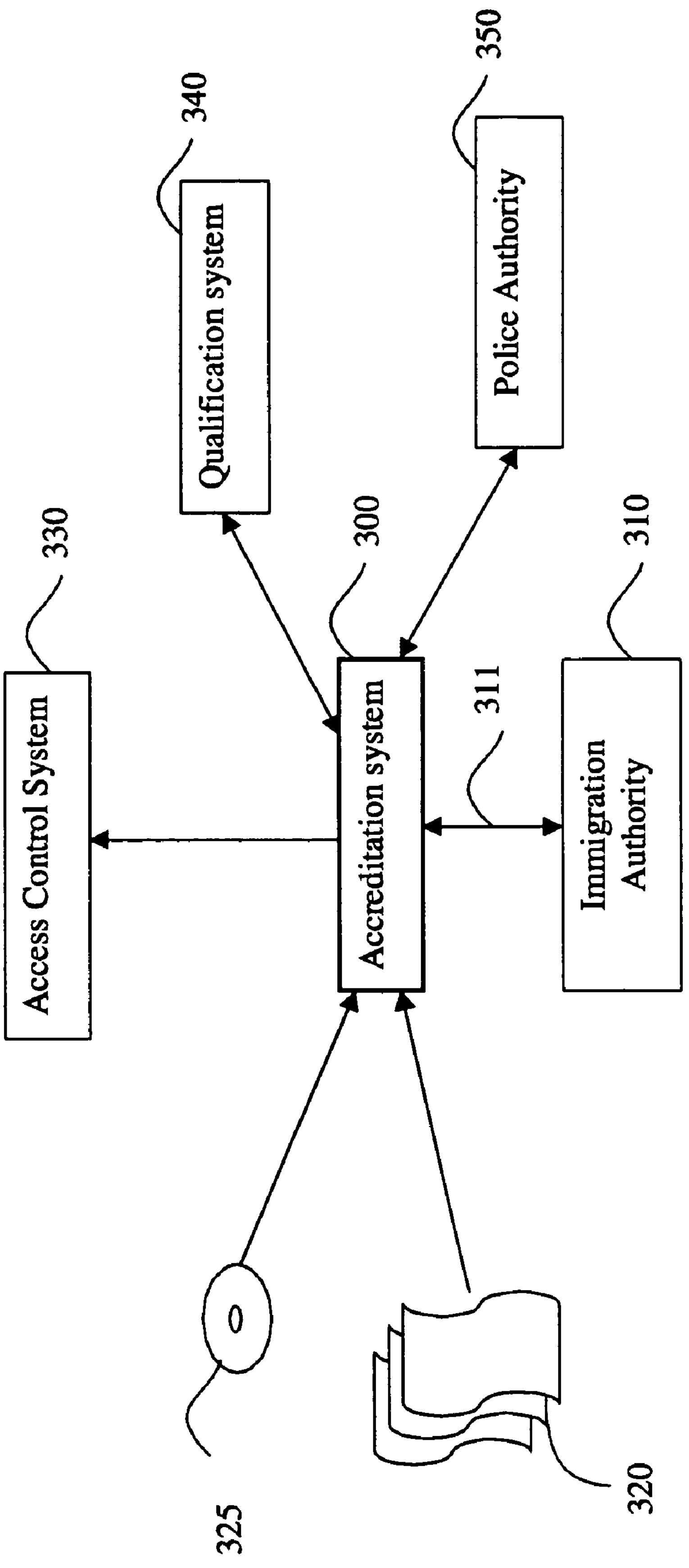
FIG. 2 shows the accreditation system and elements interacting with the accreditation system.

Also forming part of the registration set-up step 210 is sub-step 215, where application forms are sent to participants. Application forms may be sent to the participants through their respective organisations. Participants may also be invited to register on-line through an appropriately configured web site. Referring to FIG. 2, a link to qualification system 340 is also provided. In case of an Olympic games event, the qualification system 340 would be the Olympic Entries Qualification System, which is a computerised support application used to track and monitor the likely athletes in their particular sports and events. The qualification system 340 provides to the accreditation system 300 the particulars of all or some of the participants. In the case of the Olympic Entries Qualification System, it provides the particulars of the athletes only.

Initially, the qualification system 340 provides to the accreditation system 300 the particulars of all the athletes that potentially may be qualified to compete at the event. As the date of the event approaches, the list of athletes that may compete is refined by the qualification system 340, and updated in the accreditation system 300.

Referring again to FIG. 1A, the accreditation process 200 continues to step 220 where participants are registered. The registration step 220 also consists of a number of sub-step shown in FIG. 1C. Sub-step 221 of the registration step 220 consists of the recording of data of the participants into an accreditation database forming part of the accreditation system 300. Referring to FIG. 2, participants' data is gathered through returned registration forms 320 previously sent to the participants in sub-step 215. The system 300 creates a unique registration number for each participant. A digital photograph image of each participant is also captured and the image data is linked to the participant's data. The image capturing may be performed by scanning a paper photograph or by capturing a digital image directly using a digital camera.

In the preferred embodiment, the organisations record the participants' data, including the photograph image, and the data is entered into the accreditation database through an electronic file 325 received from the organisation.

The accreditation system 300 may also link to a Police Authority 350, allowing security checks to be performed on participants. The Police Authority 350 responds with a security status.

Furthermore, in the preferred embodiment an interface 311 is provided to a governmental Immigration Authority 310. In a sub-step 222 (FIG. 1C), the accreditation system 300 sends visa requests to an Immigration Authority on behalf of participants from abroad once their participation has been confirmed. In the case of an Olympic event, participation is confirmed through the Olympic Entries Qualification System. The immigration department 310 replies to the accreditation system 300 through interface 311 with a visa Authority. This provides participants traveling from abroad with an authority to travel to the country where the event is held.

Referring again to FIG. 1A, the registration step 220 is followed by step 230 where non-valid accreditation passes are produced by the accreditation system 300.

The passes may contain the following information:

Accreditation number (in numerical and barcode form);

Photograph image;

GIVEN NAME, FAMILY NAME (Accreditation Name if different);

Function;

Organisation name;

Zone Access; and

Entitlements (such as food, transport seating access).

In cases where the number of participants allowed in their particular area are limited, a two part pass is issued. For example, a limited number of support persons is allowed onto the track. Each support group manager is therefore given access for a limited number of his support staff.

A first part containing the participant's personal details is issued to each of these participants, which are each of the reporters and photographers in the example. No privileges or minimal privilege information is contained on these first part passes.

A number of second parts are issued to the organisation, named a responsible organisation in this case. In the example, the responsible organisation is the support organisation. The organisations apply for second part passes. The second part displays access privileges. The number of second parts issued is determined by the limitations of the particular participants allowed in those particular areas, which is typically less than the number of first parts issued. The responsible organisation is in charge of administering the distribution of the second part passes to the appropriate participants. This is typically done on a shift-by-shift basis and according to operational requirements. The two-part passes are only valid when both parts of the pass are used in conjunction with each other.

In step 235 the non-valid accreditation passes, which also includes first parts of two-part passes, are issued to the participants. Second part passes are issued to responsible organisations. For participants whose registration form and image have been received before a predetermined deadline, the non-valid accreditation passes are produced and issued to the participants in advance. For the remainder of the participants, their non-valid accreditation passes are issued to them on their arrival at the event, or at an airport for participants from abroad. It is noted that the issue of a non-valid accreditation pass to a participant does not automatically entitle the participant to be accredited.

Validation of each non-valid accreditation pass is performed in step 250 to produce a valid accreditation pass. However, before the passes are validated, the participants go through a step 240 of verification. Typically, the data of the participant is verified and proof of identity may be required.

A non-valid accreditation pass is validated in step 250 by updating the accreditation status of the participant on the accreditation system 300, and laminating the accreditation pass into a security pouch. A validated accreditation pass serves as an identification and access control device to be worn by all participants. Therefore, the validated accreditation pass consists of a physical part, namely the accreditation pass itself once laminated, and a logical part being the participant's accreditation status, which has been updated on the accreditation system 300. The updated status of the participant is also sent to an electronic access control system 330, thereby allowing the access control system 330 to allow the participant access according to the assigned privileges of each participant.

During the event, temporary passes may be issued to participants with a validated accreditation status on the accreditation system 300. The temporary passes provide to such participants temporary privileges not granted by their regular validated pass, or the same privileges to those participants who have temporarily misplaced their accreditation pass. These temporary passes are typically valid for one day and would include a date for which it is valid. Day passes typically would not include a photograph image.

The accreditation system 300 may be specially constructed for the required purposes, or may comprise a general-purpose computer or other device selectively activated or reconfigured by a computer program stored in the computer. The steps presented herein are not inherently related to any particular computer or other apparatus. Various general-purpose machines may be used with programs in accordance with the teachings herein. Alternatively, the construction of more specialized apparatus to perform the required method steps may be appropriate.

Figure 3:
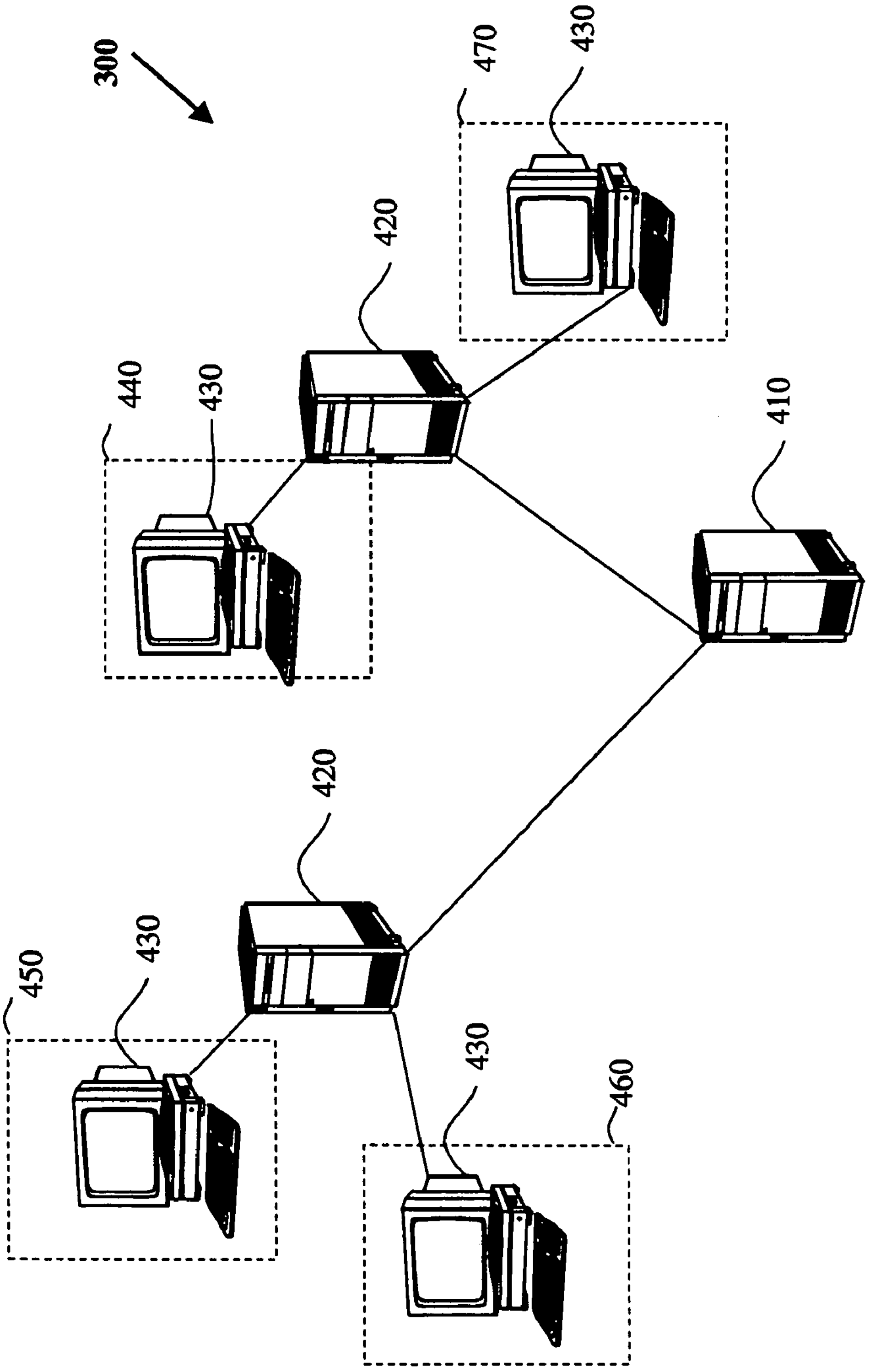
FIG. 3 shows the accreditation system implemented on a distributed computer system.

In the preferred embodiment, and as illustrated in FIG. 3, the accreditation system 300 comprises a number of computer modules 410, 420, and 430 connected to a wide area network, and in a manner which results in a conventional mode of operation of the computer modules 410, 420, and 430 known to those in the relevant art. The computer modules 410, 420, and 430 typically includes a number of servers 410, 420 and personal computers 430 which are physically located at a number of different locations. For example, computer modules may be located at the entrance to the event 440, registration centres 450, 460 and an airport 470.

Preferably copies of the accreditation database are kept on more than one of the servers 410 and 420 of the wide area network, thereby ensuring continuous operation even in the event that a part of the wide area network gets isolated from the rest.

The foregoing describes only one embodiment of the present invention, and modifications and/or changes can be made thereto without departing from the scope and spirit of the invention, the embodiment(s) being illustrative and not restrictive.

We claim:

1. A method of accrediting participants to an event, said method comprising the steps of:

a) collecting information from each of said participants;

b) recording the information in an accreditation system;

c) producing a non-valid pass for each of said participants;

d) issuing the respective non-valid passes to said participants; and e) upon arrival of such a participant at or proximate an event venue, validating said non-valid pass for the participant, thereby accrediting said participant, wherein the non-valid pass is issued in d) prior to the participant's arrival and the participant presents the non-valid pass for validation upon such arrival, or else the non-valid pass is issued in d) to the participant upon such participant's arrival so that the non-valid, issued pass can then be validated, and wherein the validating of the non-valid, issued pass in step e) includes the steps of:

updating an accreditation status of the participant in the accreditation system; and laminating the pass in a security pouch, wherein the laminated pass includes a photograph of the participant to provide a physical form of validation, so that the participant is granted access to the event responsive to identifying the pass in the security pouch as worn by the participant, and wherein the pass is for access to the event and not for access to repeated instances of the event.

2. The method of claim 1, comprising the further step of:

upon arrival of such a participant, verifying information of said participant before said non-valid pass is validated.

3. The method of claim 1, comprising the further steps of:

for foreign participants and before arrival of participants, sending a bulk visa request to an Immigration Authority; and receiving a visa status from said Immigration Authority, allowing said validated pass to serve as a visa.

4. The method of claim 1, comprising the further steps of:

ascribing an accreditation class to each of said participants; and ascribing privileges to each of said accreditation classes.

5. Apparatus for accrediting participants to an event, said apparatus comprising:

means for collecting information from each of said participants;

means for recording the information in an accreditation system;

producing means for producing a non-valid pass for each of said participants;

issuing means for issuing the respective non-valid passes to said participants; and validating means for validating said non-valid pass for such a participant upon the participant's arrival at, or proximate an event venue, thereby accrediting said participant, wherein the non-valid pass is issued prior to the participant's arrival and the participant presents the non-valid pass for validation upon such arrival, or else the non-valid pass is issued to the participant upon such participant's arrival so that the non-valid, issued pass can then be validated, and wherein the validating means of the non-valid, issued pass includes:

means for updating the accreditation status of the participant in the accreditation system; and means for laminating the pass in a security pouch, wherein the laminated pass includes a photograph of the participant to provide a physical form of validation, so that the participant is granted access to the event responsive to identifying the pass in the security pouch as worn by the participant, and wherein the pass is for access to the event and not for access to repeated instances of the event.

6. The apparatus of claim 5, further comprising:

for foreign participants and before arrival of said participants, means for sending a bulk visa request to an Immigration Authority; and means for receiving a visa status from said Immigration Authority, allowing said validated pass to serve as a visa.

7. The apparatus of claim 5, further comprising:

means for ascribing an accreditation class to each of said participants; and means for ascribing privileges to each of said accreditation classes.

8. The apparatus of claim 5, wherein said apparatus is a distributed system comprising interconnected servers and workstations.

9. The method of claim 1, wherein the non-valid passes issued to the participants are issued by an organiser of the event, wherein the participant non-valid passes form a first portion of a valid pass and the participants include support staff associated with organisations supporting the event, and wherein the method comprises the steps of:

producing support organisation non-valid passes, wherein such a support organisation non-valid pass forms a second portion of a valid pass; and issuing the support organisation non-valid passes by the event organiser for distribution by said support organisations to selected ones of the participants associated with the respective support organisations, wherein the support organisation non-valid passes and the participant non-valid passes are issued in differing quantities, the quantity of support organisation non-valid passes being smaller than that of the participant non-valid passes, and wherein the validating in step e) uses both the first and second portions of the pass.

10. The apparatus of claim 5, wherein the non-valid passes issued to the participants are issued by an organiser of the event, wherein the participant non-valid passes form a first portion of a valid pass and the participants include support staff associated with organisations supporting the event;

wherein the producing means is further for producing support organisation non-valid passes, wherein such a support organisation non-valid pass forms a second portion of a valid pass; and wherein the issuing means is further for issuing the support organisation non-valid passes by the event organizer for distribution by said support organisations to selected ones of the participants associated with the respective support organisations, wherein the support organisation non-valid passes and the participant non-valid passes are issued in differing quantities, the quantity of support organisation non-valid passes being smaller than that of the participant non-valid passes, and wherein the validating means uses both the first and second portions of the pass.

* * * * *